June 30, 1959

R. W. FRITTS ET AL 2,892,879

SHOCK-RESISTANT MOUNTING MEANS FOR
FRANGIBLE ELECTRICAL CONDUCTORS

Filed April 8, 1955

INVENTORS
Robert W. Fritts
Sebastian Karrer
BY
Seegert & Schwalbach
Attys

June 30, 1959 R. W. FRITTS ET AL 2,892,879
SHOCK-RESISTANT MOUNTING MEANS FOR
FRANGIBLE ELECTRICAL CONDUCTORS
Filed April 8, 1955 3 Sheets-Sheet 2

INVENTORS
Robert W. Fritts
Sebastian Karrer
BY
Seegert & Schwalbach
Attorneys

United States Patent Office 2,892,879
Patented June 30, 1959

2,892,879

SHOCK-RESISTANT MOUNTING MEANS FOR FRANGIBLE ELECTRICAL CONDUCTORS

Robert W. Fritts, Elm Grove, Wis., and Sebastian Karrer, Port Republic, Md., assignors, by mesne assignments, to Minnesota Mining and Manufacturing Company, St. Paul, Minn., a corporation of Delaware Application April 8, 1955, Serial No. 500,192

9 Claims. (Cl. 136—4)

This invention relates to improvements in electrical devices utilizing electrically conductive elements of frangible material, and more particularly to electrical devices embodying improved shock-resistant mounting means for such elements.

In the development of improved electrical devices, it has been found desirable to utilize components of electrically conductive material which is of a frangible nature. For example, semi-metallic alloys or compositions have been found to be particularly well adapted for use in thermoelectric devices for conversion or transfer of heat and electrical energy. Thermoelectric generators are illustrative of one such use of semi-metallic components. Utilization of semi-metallic alloys as electrical conductors presents problems not ordinarily encountered in the use, for example, of metallic electrical conductor elements, said problems arising from the characteristic physical and chemical differences between metallic elements and semi-metallic elements. For example, electrical conductors utilized as thermocouple elements are of necessity subjected to high temperatures and to large temperature changes, and treatment of semi-metallic electrical conductors utilized as thermocouple elements in the same manner as metallic elements would quickly destroy the semi-metallic elements, since at elevated temperatures semi-metallic elements oxidize rapidly and suffer undesirable changes in their electrical properties. Moreover, the mechanical or physical strength of semi-metallic elements is such that they are able to withstand only small tensile or shearing stresses, although mild compressive loads can be supported indefinitely.

In the use of semi-metallic materials in thermocouples, for example, the problem presented by the low physical strength of the semi-metallic element is further complicated by the fact that for maximum thermal or electrical efficiency said elements are formed with a length greater than the cross-sectional dimension thereof, for example in elongated cylindrical ingots. When an element of the aforementioned character is held at one or both ends, subjecting said element to acceleration or shock acting transversely to the longitudinal axis thereof produces relatively severe tensile stresses within the element tending to produce fracture thereof. To prevent such fracture, the net stresses, particularly tensile stresses, to which a semi-metallic element is subjected must not exceed the physical strength of said element. To accomplish this, the mounting for a semi-metallic element must not only protect said element against stresses which might arise therein as a result of the aforementioned transverse acceleration or shock, but it must also be so constructed that on thermal expansion any mismatch between the semi-metallic element and the surrounding parts tending to stress said element tends to exert a compressive stress on said element rather than to exert a tensile stress thereon.

It is therefore among the objects of the present invention to provide an improved electrical device, for example a thermoelectric generator, embodying shock-resistant mounting means for an electrically conductive element of frangible, for example semi-metallic, material.

Another object is to provide an electrical device of the aforementioned character including a frangible conductor element wherein:

(1) The element is provided with an hermetically sealed enclosure affording disposition of said element in an inert atmosphere preventing, for the lifetime of the device, exposure of said element to oxygen or other deleterious gases.

(2) The element is supported within the enclosure in a manner to allow displacement of at least a part of said element for dissipation of the kinetic energy change for the element during transverse acceleration or shock without permitting impact of the element against the enclosure; and/or the element is placed under compression to reduce the net tensile stresses exerted thereon during transverse acceleration wherefore increased bending displacement of said element is permitted within the physical limits, and more particularly the tensile strength thereof.

(3) The thermal expansion differential between the element and its mounting is such that any residual stresses resulting from a thermal expansion differential between the two are compressive in nature with respect to the element and fall within the compressive strength of said element.

(4) The electrical connections for the element are of a nature to afford continuity of the electrical circuit during displacement due to mechanical shock and/or thermal expansion and contraction.

(5) The electrical connections for the element are of such a character as to be chemically stable with respect to said element.

(6) Efficient heat transfer through the assembly is provided by exposure of the thermal junctions of the element within the enclosure permitting radiative and/or conductive heat transfer to and from said junctions through said enclosure, thereby affording maximum conversion efficiency.

Another object of the invention is to provide a device of the aforementioned character having integral therewith a coaxial type lead, there being hermetic sealing means at the connector end of said lead whereby said lead and the enclosure for said element form a single hermetically sealed envelope.

Other objects and advantages of the invention will become apparent as the description proceeds, reference being had to the drawings accompanying and forming a part of this specification and illustrating various embodiments of the inventive concept. The illustrated embodiments of electrical devices utilizing frangible electrically conductive elements each take the form of a thermocouple having a semi-metallic thermoelectric element. In the drawings.

Figures 1, 2:
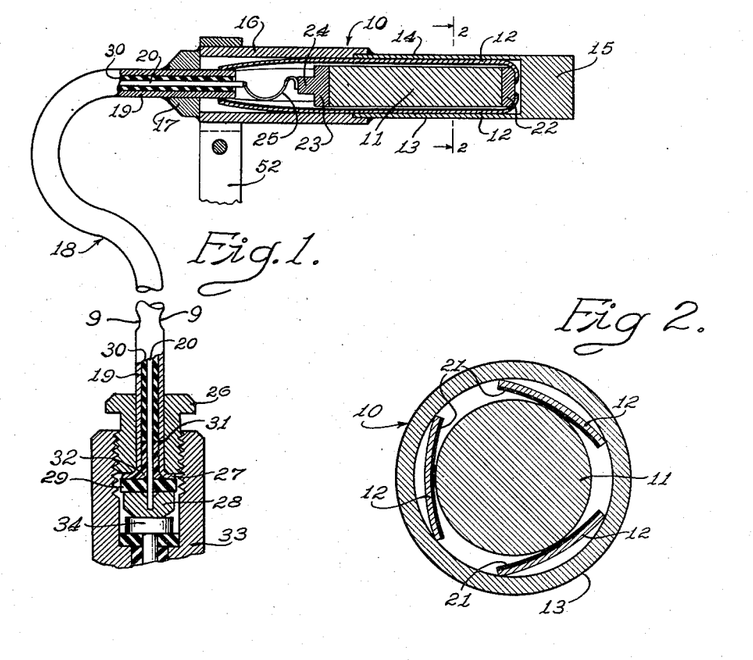
Figure 1 is a fragmentary elevational view, partly in longitudinal section, showing a thermocouple and lead assembly constructed in accordance with the teachings of the present invention.
Figure 2 is an enlarged transverse sectional view taken approximately along the line 2—2 of Figure 1.

Referring now to Figure 1 of the drawings, the electrical device selected for illustration therein comprises a thermoelectric generator 10 including a pair of thermocouple element means 11 and 12 disposed within an hermetically sealed enclosure comprising an elongated generally cup-shaped sheath member 13, preferably of stainless steel, having a tubular sleeve portion 14 and a tip portion 15 which may serve as heat probe means for the assembly. The opposite end of the sheath 13 is coaxially received in a counterbore formed in one end of an extension tube 16 of brass or other suitable material. The other end of the tube 16 is closed by a metal cap member 17 which is centrally bored to snugly receive one end of a coaxial type thermoelectric generator lead 18 comprising a metallic tubular outer conductor 19 and an insulated coaxial inner conductor 20. The sheath 13 and cap 17 are sealingly and electrically connected to the tube 16 for example by silver soldering or brazing, and the lead 18 is similarly connected to the cap 17.

The thermocouple element means 11 is of frangible material and may take the form of a rod-like or cylindrical ingot of semi-metallic alloy or composition. The thermocouple element means 12 is constructed in a manner to provide resilient mounting means for the thermocouple element 11, engaging the latter throughout its length and resiliently maintaining said element in coaxial spaced relationship within the sheath 13. As shown most clearly in Figure 2, the thermocouple element means 12 comprises at least three relatively thin flat strips or bands of deformable, preferably resilient, metal, equiangularly spaced around the thermocouple element 11 and extending the full length and beyond one end of said element to an electrical circuit connection with the outer conductor 19 of the lead 18. The side edges of the metal bands 12 engage the inner surface of the sheath 13 and of the tube 16, and the outer cylindrical surface of the element 11 is engaged by a central longitudinal portion of the inner surface of the metal bands 12.

In order to permit the metal bands 12 to function as a second thermocouple element means while in physical contact with the thermocouple element 11, the inner surfaces of each of said metal bands are provided with an electrically insulating film or layer 21 electrically insulating the inner surfaces of said metal bands from the thermocouple element 11. Silicone resins and varnishes have been found to work out satisfactorily as the insulating films 21 which, because of the low voltages developed, may be very thin. Because of the thin character of the films 21 the bands 12 are formed of metal having a thermal expansion coefficient matching that of the thermocouple element 11, thereby avoiding relative displacement of the bands on said element tending to rub the insulating film 21 off of said element. As an example of such matching, an element 11 of certain lead and selenium-tellurium alloy composition has a coefficient of thermal expansion of approximately $18 \times 10^{-6}$ per degree centigrade which matches the coefficient of thermal expansion of austenitic stainless steel (also approximately $18 \times 10^{-6}$ per degree centigrate) which is one of the preferred materials for use in the bands 12 and sheath 13. Another satisfactory material for use in the bands 12 and having a similar coefficient of thermal expansion is beryllium copper alloy.

The outer ends of the metal bands 12 are turned radially inwardly and said ends and the outer end of the thermocouple element 11 are mechanically and electrically joined, as through a contact electrode 22 to be hereinafter described, to provide a hot junction for the thermocouple 10. The element 11 is one element of the couple 10, while the bands 12 serve both as a cushion for the element 11 and as the other element of the couple 10. The thermal voltages developed in the elements 11 and 12 are preferably of opposite sign (relative to platinum) with respect to the temperature gradient, and hence are additive in a series circuit formed between a cold junction tip 24 forming a part of a contact electrode 23, and the cold ends of the metal bands 12. In the illustrated embodiment, where the element 11 generates a negative E.M.F., the bands 12 should generate a positive E.M.F. Austenitic stainless steel and beryllium copper alloys are examples of metals which generate a positive E.M.F., and can be used for the bands 12. Where a positive element 11 is used, the bands 12 are preferably made of metal which generates a negative E.M.F. for example Alumel or constantan. The cold junction pin 24 is connected in circuit with the inner conductor 20 of the lead 18 by means of a flexible conductor 25 as shown to permit differential thermal expansion between the elements 11 and 12.

Figure 6:
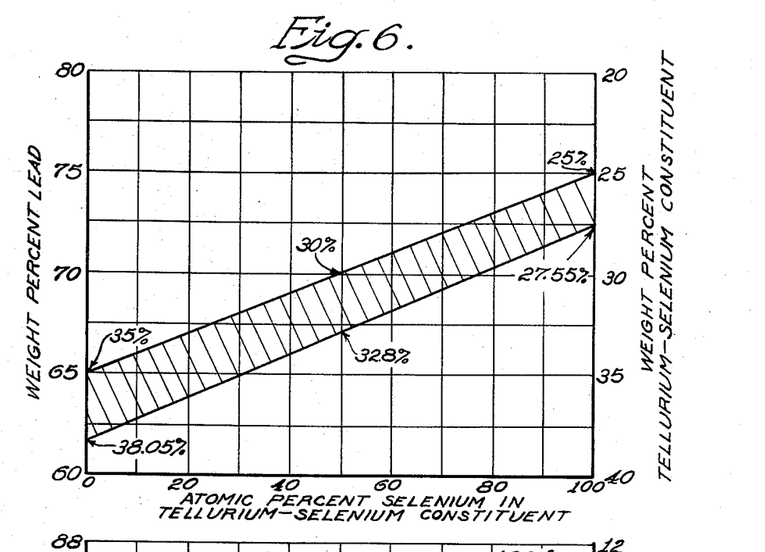
Figure 6 is a graphic illustration of semi-metallic lead-selenium-tellurium compositions which may be used as the electrically conductive element in the thermoelectric generators illustrated in Figures 1 through 5.

The thermocouple element 11 is a semi-metallic element and may be formed for example of an alloy further described in the copending application of Sebastian Karrer, Serial No. 475,540, filed December 15, 1954, now Patent No. 2,811,570, comprising lead and at least one member of the group tellurium, selenium and sulphur. Figure 6 graphically illustrates alloys of lead, selenium and tellurium usable for the thermoelectric element 11, the horizontal coordinate representing, in atomic percent, the various proportions of selenium in the tellurium-selenium constituent and ranging from tellurium containing but a trace of selenium on the left, to selenium containing but a trace of tellurium on the right. The left hand vertical scale indicates, in terms of percent by weight, the amount of lead which can be alloyed with the selenium-tellurium constituent for any proportions of the latter, while the right hand vertical scale conversely represents the percent by weight of selenium-tellurium constituent, for any proportions of the latter in the final composition, the remainder being lead.

For example, a thermoelectric element 11 of lead-selenium-tellurium composition could include a tellurium-selenium constituent in which the selenium is but a trace. In this case such constituent should constitute from 35% to 38.05% by weight of the composition, the balance (61.95% to 65% by weight) being lead. At the other extreme, where the tellurium-selenium constituent consists almost entirely of selenium with but a trace of tellurium, such constituent should comprise from 25% to 27.55% by weight of the final composition, the remainder (from 72.45% to 75% by weight) being lead. As a further example, where the selenium and tellurium are equal (in atomic percent) in the tellurium-selenium constituent, the latter should constitute from 30% to 32.8% by weight of the composition, the remainder (67.2% to 70% by weight) being lead. The compositions graphically illustrated at the right and left hand extremes of both Figures 6 and 7 are for convenience hereinafter designated "terminal" compositions.

Figure 7:
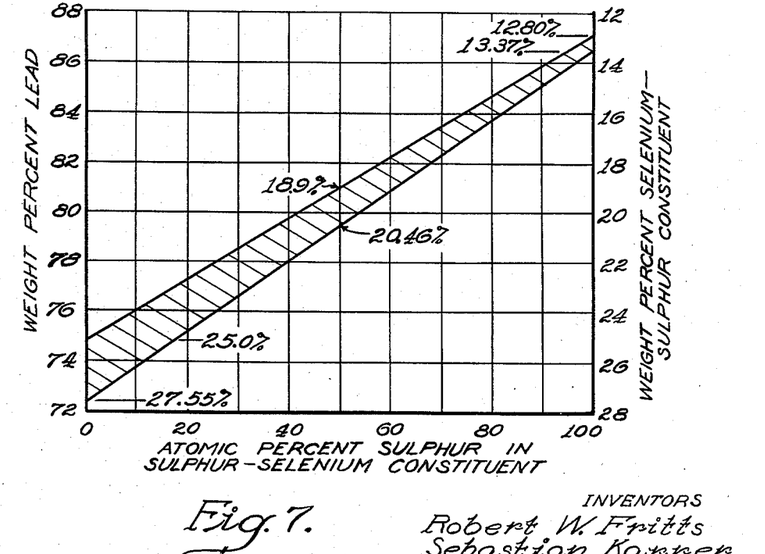
Figure 7 is a graphic illustration of semi-metallic lead-selenium-sulphur compositions which may be used as the electrically conductive element in the thermoelectric generators illustrated in Figures 1 through 5.

The thermoelectric element 11 may also be formed of an alloy of lead, selenium and sulphur of the character graphically illustrated in Figure 7. In Figure 7 it will be observed that the horizontal coordinate represents in atomic per cent the various proportions of sulphur in the sulphur-selenium constituent, ranging from selenium containing but a trace of sulphur on the left to sulphur containing but a trace of selenium on the right. The left hand vertical scale indicates the amount of lead (in terms of percent by weight) which can be alloyed with the selenium-sulphur constituent for any proportions of the latter, while the right hand vertical scale conversely indicates the percent by weight of the selenium-sulphur constituent for any proportions of the latter in the final composition, the remainder being lead.

For example, a thermoelectric element 11 of the lead-selenium-sulphur composition could consist of a selenium-sulphur constituent in which the sulphur is but a trace. In this case, such constituent should constitute from 25% to 27.55% by weight of the composition, the balance (75% to 72.45% by weight) being lead. At the other extreme, where the selenium-sulphur constituent consists almost entirely of sulphur with but a trace of selenium, such constituent should comprise from 12.8% to 13.37% by weight of the final composition, the remainder (from 87.2% to 86.63% by weight) being lead. As a further example, where the selenium and sulphur are equal (in atomic percent) in the selenium-sulphur constituent, the latter should constitute from 18.9% to 20.46% by weight of the composition, the remainder (81.1% to 79.54% by weight) being lead.

The proportions and ranges of the various constituents aforementioned and those illustrated in the graphic representations constituting Figures 6 and 7 of the drawings must be considered as critical if the composition is to have the electrical and physical properties desired. The minimum limits of the lead constituent in the compositions of the invention (illustrated graphically by the lower curves of Figures 6 and 7) must be regarded as critical, since if the lead content is significantly less than this amount for any particular selenium-tellurium or selenium-sulphur proportion, the polarity of the Seebeck E.M.F. changes and the desired electrical and mechanical properties will not be reproducible. On the other hand, if the lead content of any composition appreciably exceeds the maximum limit (illustrated graphically by the upper curves of Figures 6 and 7), the resulting composition is too metallic in nature to afford satisfactory energy conversion efficiencies.

Not only are the proportions and ranges aforedescribed to be considered critical, but so also is the purity. More specifically, the limit of tolerable metallic impurity in the final composition has been found to be on the order of 0.01%, and the composition must be substantially oxygen free, if the mechanical and electrical properties desired are to be obtained and to be reproducible. Such purity may be achieved by the utilization of lead, selenium and tellurium or sulphur which do not contain metallic impurities exceeding the order of 0.01%. Alternatively, starting constituents of lesser purity may be utilized where the formed composition is put through a recrystallization step to provide a final or end composition of the order of purity aforeindicated.

The aforedescribed semi-metallic alloys or compositions may be characterized as binary metallic compounds of slightly imperfect composition, i.e. containing beneficial impurities constituting departures from perfect stoichiometry by reason of an excess of one of the metals over and other, and/or containing added beneficial impurity substances denominated hereinafter "promoters." Such semi-metallic compositions have semi-conductor like conductance, both electrical and thermal. As graphically illustrated in Figures 6 and 7, such semi-metallic alloys or compositions also include mixtures of such binary metallic compounds, which may be denominated ternary metallic alloys or compositions. Certain of these alloys or compositions exhibit negative and certain exhibit positive electrical characteristics.

With regard to the specified ranges for the various compositions graphically illustrated in Figures 6 and 7, it will be observed that in each case there is an excess of lead over and above the amount thereof necessary for satisfying the stoichiometric proportions of the compound formed with the second constituent or constituents, i.e. the tellurium, selenium or sulphur. Taking by way of example the aforementioned terminal compositions, it will be noted that the first terminal composition consisting substantially of lead and tellurium (see Figure 6) contains from 61.95% to 65% by weight lead, or from .16% to 8.9% lead by weight of the total composition over and above the 61.89% lead stoichiometrically necessary to combine with the tellurium. Similarly, the terminal composition consisting substantially of lead and selenium (see also Figure 6) contains from .15% to 10.4% lead by weight of the total composition over and above the 72.41% by weight lead stoichiometrically necessary for combination with the selenium. The same is, of course, true with respect to the terminal composition consisting substantially of lead and sulphur wherein the amount of lead specified in Figure 7 is from .23% to 4.7% lead by weight of the total composition more than that necessary to stoichiometrically combine with the sulphur present, i.e. 86.60% by weight of lead. Similarly, for any of the compositions intermediate the aforementioned terminal compositions there exists within the composition ranges specified in Figures 6 and 7 an excess of lead over and above that stoichiometrically necessary to combine with the tellurium-selenium or selenium-sulphur constituent in percent by weight varying according to the relationship of such intermediate composition to the terminal compositions.

The electrical characteristics of the aforementioned semi-metallic alloys, desirable, for example in thermoelectric elements, can be markedly and advantageously altered in a reproducible manner by the addition thereto of controlled amounts of matter other than the constituents of the base composition (Figures 6 and 7). Such additions may also be denominated "beneficial impurities" as distinguished from undesirable impurities as aforementioned. For convenience these additions are hereinafter designated "promoters" since they tend to enhance the electrical characteristics desired for the particular application of the base composition. Since the amounts of such promoters in terms of percent by weight of the base composition are very small, for such promoters to be most effective and to afford reproducibility of electrical properties, the base composition to which they are added should have an extremely high degree of purity, i.e., it must contain not more than 0.001% by weight of undesired and uncontrolled impurities, as compared with the 0.01% of such impurity which can be tolerated in the unpromoted alloys described hereinbefore. Similarly, where such promoters are added, the lead content of the base composition should be slightly less; e.g. a maximum of 63.0%, 73.5% and 87.10% by weight respectively for the various terminal compositions as compared with the corresponding maximums shown in Figures 6 and 7 of 65%, 75% and 87.2%, respectively.

All of the aforedescribed base compositions exhibit negative thermoelectric power and negative conductivity. By the addition of the promoters to be hereinafter described, such negative properties may be enhanced by the addition of certain promoters, while the polarity of the electrical properties of the base composition may be reversed by the addition of certain other promoters. Accordingly, certain promoters are denominated "positive promoters" and certain others are denominated "negative promoters," and the resultant alloy or composition may be "positive" or "negative."

"Negative" compositions or alloys are to be understood as meaning an alloy or composition which exhibits negative conductivity as evidenced by Hall effect measurements or thermoelectric effect measurements, both taken at room temperature, whereas "positive" compositions or alloys are to be understood as meaning an alloy or composition which exhibits positive conductivity as evidenced by Hall effect measurements or thermoelectric effect measurements, both taken at room temperature.

"Negative promoters" are those which when added to the base alloys aforedescribed alter the electrical conductivity thereof without changing the polarity of the conductivity or thermoelectric power of the base alloys (it being negative according to the preceding definition). "Positive promoters" are those which when added to the base alloys aforedescribed cause at first, with very small additions, reduction in the conductivity of the alloy to a minimum value beyond which further increase in the concentration of the "positive promoters" causes an increase in the conductivity of the alloy accompanied by the reversal in the polarity of the conductivity and thermoelectric power, i.e. from negative to positive.

The functions of such negative and positive promoters should be contrasted for the sake of clarity as follows:

(1) Increasing concentrations of the negative promoters increase the conductivity and decrease the thermoelectric power of the resulting alloy as compared to that of the base alloy while preserving the negative polarity of the conductivity and thermoelectric power.

(2) Increasing concentrations of the positive promoters initially reduce the conductivity and increase the Seebeck E.M.F. of the base alloy until a minimum conductivity is reached, whereupon the thermoelectric power and conductivity reverse polarity to the positive sense and further increases in the concentration of the positive promoters increases the conductivity and decreases the thermoelectric power of the resulting alloy.

Our copending applications Serial Nos. 475,541; 475,542 and 475,543 all filed on December 15, 1954, now Patents Nos. 2,811,440; 2,811,720; and 2,811,721 respectively, give a complete description of the promoters which have been found to be effective for improvement of the electrical properties of the aforedescribed semi-metallic elements when added to the aforementioned base compositions in minor amounts. In this specification the aforementioned promoters are, for convenience, discussed in terms of the terminal compositions of the purity and composition as aforedescribed, it being understood that such promoters may also be added to any of the intermediate compositions with beneficial results. In this case the promoters added should be proportioned, both in kind and in amount, according to the relative concentrations of the terminal compositions in the intermediate composition comprising a mixture of such terminal compositions.

Table I below, in the first column thereof, lists certain elements which are effective as negative promoters when added to the aforementioned lead-tellurium base alloys or compositions. The second column of Table I lists the order of effective maximum concentration limits by weight percent of such promoters to the base alloy. It is to be understood that these concentration limits are the maximum which effectively alter the electrical properties of the base alloy.

TABLE I

*Lead-tellurium base alloys*

| Negative Promoters | Order of Maximum Effective Concentration Limits by Weight Percent |
| --- | --- |
| Bismuth | 0.60–1.20 |
| Tantalum | 0.50 |
| Manganese | 0.25 |
| Zirconium | 0.25 |
| Titanium | 0.15 |
| Aluminum | 0.10 |
| Gallium | 0.25 |
| Chlorine | 0.10 |
| Bromine | 0.20 |
| Iodine | 0.25 |
| Uranium | 0.80 |

As previously mentioned certain positive promoters may also be alloyed with the aforementioned lead-tellurium alloys, and such promoters are listed in column 1 of Table II below. Column 2 of Table II sets forth the concentration by weight percent of the positive promoters listed at which the polarity of conductivity and thermoelectric power of the promoted alloy reverses. Column 3 of Table II, like column 2 of Table I, sets forth the order of the effective maximum concentration limits by weight percent of such promoters to the base alloy.

TABLE II

*Lead-tellurium base alloys*

| Positive Promoters | Concentration, Weight Percent at which Polarity Reverses | Order of Maximum Effective Concentration Limit by Weight Percent |
| --- | --- | --- |
| Sodium | .0002 | 0.06 |
| Potassium | .0004 | 0.10 |
| Thallium | .005 to .02 | 0.25–1.00 |
| Arsenic | .0008 to .002 | 0.07–0.25 |

Table III below, the first column thereof, lists certain elements which are effective as negative promoters when added to the aforementioned lead-selenium base alloys or compositions. The second column of Table III lists the order of the effective maximum concentration limits by weight percent of such promoters to the base alloy. Here too, it is to be understood that these concentration limits are the maximum which effectively alter the electrical properties of the base alloy.

TABLE III

*Lead-selenium base alloys*

| Negative Promoters | Order of Maximum Effective Concentration Limits by Weight Percent |
| --- | --- |
| Iodine | 0.50 |
| Chlorine | 0.20 |
| Bromine | 0.60 |
| Zirconium | 0.60 |
| Silicon | 0.10 |
| Titanium | 0.10 |
| Indium | 0.20 |
| Tantalum | 0.60 |
| Gallium | 0.15 |
| Aluminum | 0.03 |
| Copper | 0.30 |
| Gold | 0.35 |
| Bismuth | 0.40–2.5 |
| Antimony | 0.20–1.5 |
| Fluorine | 0.02 |
| Columbium | 0.35 |

Listed in column 1 of Table IV below are certain positive promoters which may also be alloyed with the aforementioned lead-selenium alloys. Column 2 of Table IV sets forth the concentration by weight of the positive promoters listed at which the polarity of conductivity and thermoelectric power of the promoted alloy reverses. Column 3 of Table IV, like the corresponding column of Table II, sets forth the order of effective maximum concentration limits by weight percent of such promoters to the base alloy.

TABLE IV

*Lead-selenium base alloys*

| Positive Promoters | Concentration, Weight Percent at which Polarity Reverses | Order of Maximum Effective Concentration Limit by Weight Percent |
| --- | --- | --- |
| Sodium | .002 | 0.08 |
| Thallium | .04–.08 | 0.72–1.5 |
| Potassium | .003 | 0.15 |
| Lithium | .002 | 0.03 |
| Arsenic | .02–.06 | 0.10–0.30 |

Certain elements which are effective as negative promoters when added to the aforementioned lead-sulphur base alloys or compositions are listed in the first column of Table V below. The second column of Table V lists the order of the effective maximum concentration limits by weight percent of such promoters to the base alloy. It is to be understood that these concentration limits are the maximum which effectively alter the electrical properties of the base alloy.

TABLE V

*Lead-sulphur base alloys*

| Negative Promoters | Order of Maximum Effective Concentration Limits By Weight Percent |
|---|---|
| Zirconium | 0.40 |
| Indium | 0.50 |
| Bromine | 0.35 |
| Chlorine | 0.15 |
| Titanium | 0.20 |
| Iodine | 0.55 |
| Tantalum | 0.70 |
| Bismuth | 1.0–3.0 |
| Antimony | 0.50–3.0 |
| Gallium | 0.30 |
| Columbium | 0.40 |
| Uranium | 1.0 |

Table VI below lists, in column 1 thereof, certain positive promoters which may also be alloyed with the aforementioned lead-sulphur base alloys or compositions. The second column of Table VI, like the corresponding columns in Tables II and IV, sets forth the concentration by weight percent of the positive promoters listed, at which the polarity of conductivity and thermoelectric power of the promoted alloy reverses. Column 3 of Table VI, like the corresponding columns of Tables II and IV, sets forth the order of the effective maximum concentration limits by weight percent of such promoters to the base alloy.

TABLE VI

*Lead-sulphur base alloys*

| Positive Promoters | Concentration, Weight Percent at which Polarity Reverses | Order of Maximum Effective Concentration Limit by Weight Percen |
|---|---|---|
| Sodium | 0.02 | 0.20 |
| Potassium | 0.04 | 0.30 |
| Rubidium | 0.20 | 0.70 |
| Silver | 0.30 | 2.0 |

From the foregoing description it will be noted that the maximum concentrations of beneficial impurity for promoted terminal compositions vary from 4.22% by weight (i.e. 3.02% excess lead plus 1.20% maximum for any promoter) in the case of the terminal lead-tellurium composition, to 6.6% by weight (i.e. 4.1% excess lead plus 2.5% maximum for any promoter) in the case of the terminal lead-selenium composition, to 6.9% by weight (i.e. 3.9% excess lead plus 3.0% maximum for any promoter) in the case of the terminal lead-sulphur composition. Thus, the maximum amount of beneficial impurity for any promoted composition is 6.9% by weight.

In order to utilize any of the aforementioned base alloys or third element addition promoted compositions in electrical devices, for example as thermoelectric generator elements, they must necessarily be electrically contacted. The major obstacle in this regard has been the difficulty of making electrical contact with such elements without encountering an alloying or solution of the contacting electrode therewith. Such alloying or solution between a thermoelectric element of the aforementioned composition and a contacting electrode causes a change in the composition of said element which generally results in a reduction of thermoelectric power thereof. Such alloying or solution must therefore be controllably restricted if uniformity of the electrical properties and maximum longevity of the thermoelectric element are to be achieved.

Referring again to Figure 1, mechanical and electrical contact between the metal bands 12 and the semi-metallic thermocouple element 11 is made over a substantial area of the latter through the contact electrode 22. Similar contact with the opposite end of the element 11 is made over a substantial area thereof through the contact electrode 23. Such contact electrodes provide contacts of low thermal and electric resistance, and are chemically stable with respect to the element 11. As more fully described in the copending application of Russell E. Fredrick, Robert W. Fritts and William V. Huck, Serial No. 475,539, filed December 15, 1954, now Patent No. 2,811,569, iron is especially adapted for use as contact electrode material with lead-tellurium-selenium compositions in that it does not alloy or dissolve in such elements at temperatures below 700° C., which is well above the ordinary upper limit of operating temperatures for elements of lead-tellurium-selenium composition. For a semi-metallic element of any of the compositions aforedescribed, including those comprising lead and sulphur, contact electrodes of carbon having pressure type contact with the element are suitable.

The contact electrodes 22 and 23 may be of either a pressure or bonded type. In the latter case the element-electrode interface should have a mechanical strength at least comparable to that of the alloy of which the element 11 is made. More specifically, the contact electrodes 22 and 23 may be bonded to the element 11 by either the "direct casting" or "fusion" method, more fully hereinafter described. The contact electrodes, being chemically stable with respect to the element 11, provide the necessary means for connecting said element into its electrical circuit while at the same time chemically isolating said element from the other conductors making up said circuit.

If the "direct casting" method is utilized the iron of the electrode is preferably stabilized in the alpha phase by addition of one or more known alpha phase stabilizers in order to avoid shearing of the solid bond between the element and the electrode during cooling. A preferred stabilizer for this purpose is, however, molybdenum in amount of from 2.7% to 7% by weight of the iron. If the "fusion" method of contacting the element 11 is utilized, the iron of the electrode may be stabilized in the gamma phase, alpha phase or unstabilized. Whether the "direct casting" or "fusion" method is utilized, it is important, however, that iron diffuse into the active element 11 during the contacting procedure in amount no more than 0.5% by weight of the element, lest the thermoelectric power and electrical resistivity of the element 11 be reduced more than 10%.

In the "direct casting" method, one of the contact electrodes is placed in one end of the cavity of a mold, preferably of graphite, and the selected aforedescribed alloy or composition, in chunk or granular form, is then placed in the mold in contiguous engagement with the iron electrode. The mold is then heated, preferably in a reducing atmosphere, to the melting point of the alloy, i.e., within the temperature range of 920° C. to 1100° C., for a short interval of time sufficient to produce limited alloying between the iron electrode and the semi-metallic alloy. The mold is then cooled, causing the molten semi-metallic alloy to solidify as an ingot to one end of which the iron electrode is firmly bonded.

The other end of the preformed ingot may then be bonded to the other contact electrode by the "fusion" method. In this method the end of the ingot to be contacted is pressed against the surface of the second contact electrode, and said electrode is then heated, preferably inductively, until a very thin layer of the ingot becomes molten and fuses with the surface of the electrode. Heating the iron of the contact electrode to a temperature of 730° C. to 905° C. permits migration of the iron into the semi-metallic element to form a thin layer of an alloy thereof having a melting point below the phase transformation temperature of the iron. Due to its thin section, the molten layer rapidly approaches the compositions which solidify at temperatures below the phase transformation temperatures of the iron, to form the bond. Accordingly, the time of heating is a matter of only a few seconds, after which the assembly is allowed to cool. As previously mentioned, in this method, the iron of the contact electrode need not be alpha stabilized, but may be unstabilized or even gamma-phase stabilized.

The sub-assembly comprising the element 11 with the contact electrodes 22 and 23 bonded thereto is preferably annealed at from 540° C. to 680° C. for from 10 to 20 hours in an inert or reducing atmosphere to render the composition more homogeneous.

To assemble the generator illustrated in Figure 1 after the aforementioned annealing step, the flexible connector 25 is affixed to the tip 24 of the contact electrode 23, as by silver soldering, after which the angled end portions of the elongated metal band members or spring strips 12 are affixed to the contact electrode 22, as by brazing or silver soldering. The sub-assembly comprising the element 11, with the contact electrodes 22 and 23 and the metal band members 12 affixed thereto, is then inserted into the open end of the stainless steel sheath 13. The tube extension 16, to which the cap 17 has been previously affixed, is then telescoped onto the end of the lead 18 to be connected to the generator 10, and the conductor 25 is affixed to the inner conductor 20 of said lead, as by silver soldering. The projecting ends of the metal band members 12 are then affixed, as by silver soldering to the outer surface of the outer lead conductor 19. The extension tube 16 and cap 17 are then drawn toward the sheath 13 to the position shown in Figure 1 wherein the outer end of tube 16 telescopically surrounds the open end of the sheath member 13, after which said sheath and tube are brazed or silver soldered together, and the cap 17 is similarly affixed to the outer lead conductor 19 to complete the assembly.

The coaxial lead 18 affords means for connecting the illustrated thermoelectric generator 10 into an external circuit. The end of the lead 18 remote from the generator 10 carries a connector nut 26, and the outer tubular lead conductor 19 is radially outwardly flared, as at 27, for engagement by the end of said nut. The inner lead conductor 20 has a low resistance electrical connection with a terminal tip member 28, and a relatively rigid annular insulating spacer 29 surrounds said inner lead conductor 20 and is interposed between the tip 28 and the flange 27 to insulate said tip from said flange while at the same time maintaining a predetermined minimum spacing between said flange and tip. The spacer is preferably of glass melamine or other suitable material.

The insulation 30 between the inner and outer lead conductors 20 and 19 terminates short of the flange 27, as at 31. Surrounding the inner lead conductor 20 within the outer lead conductor 19 and between the insulating washer 29 and the end portion 31 of the insulation 30, is an insulating seal 32 of pliable material, for example silicone rubber, which directly contacts both the inner and outer lead conductors. Prior to the connection of the lead 18 to the generator 10 and after the terminal tip 28 is fixed to the end of the inner conductor 20 and the seal 32 and insulating spacer 29 are positioned on said conductor, an axial pull is exerted on the inner conductor to draw the spacer 29 and tip 34 toward the flange 27 and thereby force the pliable seal 32 into the adjacent end of outer conductor 19 and into sealing engagement with both the inner conductor 20 and said outer conductor. While the inner conductor is thus under tension, the outer conductor is crimped, as at 9, to frictionally clamp the inner conductor 20 through the insulation 30. This clamping engagement maintains the portion of the inner conductor between the crimped portions 9 and the tip 34 under continuous tension so that the seal 32 is continuously compressed by the spacer 29 and the aforementioned hermetic seal between the conductors 19 and 20 is continuously maintained.

By virtue of the seal 32 and of the aforedescribed sealing connections between the lead 18 and cap 17, between the extension tube 16 and said cap and between said tube and the sheath 13, an hermetically sealed envelope is provided which encloses the thermoelectric generator elements 11 and 12 and comprises the tubular lead conductor 19, cap 17, tubular member 16 and sheath 13. This envelope or enclosure is preferably filled with an inert atmosphere to prevent oxidation of the element 11.

By having the outer lead conductor 19 form part of the hermetically sealed enclosure, the seal 32 is conveniently located remote from the couple 10 and the heat to which said couple is subjected. The seal 32 need not, therefore, be of a character which can withstand high temperatures. The lead 18 is connected into an external circuit by threading the connector nut 26 into a lead connector socket 33 having a terminal tip 34 insulatably mounted therein for contact by the terminal tip 28 in a manner well known in the art. Tightening of the nut 26 in the socket 33 compressively stresses the sealing material 32 within the tube 19 between the insulation 30 and the washer 29, thus causing said material to intimately contact all of the confining surfaces and provide an hermetic seal between the conductors 19 and 20. While the coaxial lead 18 with its improved sealing means is shown in detail in connection with the form of the invention shown in Figure 1, it is to be understood that the invention contemplates the use of said lead with each of the other forms of the invention to be shown and described hereinafter.

The metal band members or spring strips 12, in the structure illustrated in Figures 1 and 2, not only function as one thermocouple element means of the thermoelectric generator 10, but they also afford a deformable, preferably resilient, shock-resistant mounting for the element 11 which is of a frangible nature. The bands 12 engage the semi-metallic element 11 throughout its length and provide a cushion on which said element floats, so that when the thermocouple 10 is subjected to acceleration or shock acting transversely to the longitudinal dimension thereof, no substantial bending or tensile stresses arise within the element 11, since the kinetic energy of said element is dissipated by said cushioning without permitting impactual engagement of said element with the sheath 13. Fracture of the element 11 is thereby prevented.

The invention comprehends the use in the strips 12 of metal which will not be stressed beyond its elastic limit by the aforementioned shock, as well as metal which can be so stressed by said shock and which dissipates the kinetic energy of the element in cold working the metal, i.e. deforming it beyond its elastic limit and thereby causing the metal to take a permanent set. The latter type of metal strip may be used where extreme or repeated shock conditions are not likely to be encountered. Examples of the latter type of metal are iron or soft copper.

It will be noted that when the tip 15 of the sheath 13 is heated, the element 11 is free to expand and the flexible conductor 25 maintains continuity of the electrical circuit between the electrode 23 and the lead conductor 20 while at the same time affording means for isolating said electrode and the element 11 from external forces which might be applied to the lead 18.

Since, as is well known in the art, the electrical and thermal resistance of a thermoelectric generator are dependent upon the configuration thereof, as well as the electrical and thermal conductivities of the elements 11 and 12, a relationship between the dimensions of each element can be obtained which affords the highest thermal conversion efficiency in such a mounting or assembly. In the embodiments described, the thermal conductivity of the element 11 is low as compared with that of the elements 12 and sheath 13 (for example .02 w./cm./° C. as compared to .261 w./cm./° C.).

For elements of any given thermal and electrical conductivities the conversion efficiency depends strongly upon the ratio of thickness of the sheath 13 to the radius of the element 11 or more specifically upon the cross-sectional area of the two elements. In the embodiments illustrated, this ratio of the radius of the element 11 to the thickness of the sheath 13 is preferably about 6 to 1 or more.

It is understood, of course, that the conversion efficiency of the thermocouple is also dependent upon the difference between the hot and cold junction temperature. For thermocouples utilizing a semi-metallic inner element, having a low thermal conductivity, high temperature differences can be achieved by selection for the semi-metallic element a ratio of length to diameter, which in the exemplary embodiments herein disclosed is about 4 to 1, such that radiation transfer of heat from the surface of the inner element to sheath establishes substantial temperature gradients within the inner element, particularly near the hot junction. When this is done the heat flux into the inner element through the hot junction is exhausted to the case over the entire surface of the inner element allowing the cold end of the semi-metallic element, or inner cold junction, to assume a temperature only slightly greater than that of the outer cold junction. A further consequence of such radiation cooling is the reduced electrical resistance of the semi-metallic inner element, said element having a positive temperature coefficient of resistance.

The radiation responsible for the removal of the heat transmitted across the hot junction takes place between the element 11, its cold junction electrode 23, and the metal walls of the sheath 13 and extension tube 16. Since the cold junction temperature under such circumstances is dependent upon the temperature of its environment, it is, therefore, desirable to keep the ambient temperatures low. The extension of the sheath to a cooler zone, as by the extension tube 16, provides a heat sink which aids in cooling the casing around the cold junction. Additionally, heat may be withdrawn from the cold junction at the juncture of elements 12 with the outer lead conductor 19 by conduction through said conductor, the cap 17, tube 16, and a mounting bracket 52 clamped around the extension tube 16 where such mounting bracket is attached to a supporting member (not shown) of lower temperature. While the mounting bracket 52 is shown only in connection with the form of the invention shown in Figure 1, the invention contemplates the use of such bracket in each of the other forms of the invention described hereinafter. Radiation from the sheath 13 to the environment also aids in removing the heat flowing through said sheath and the elements 12.

Figure 3:
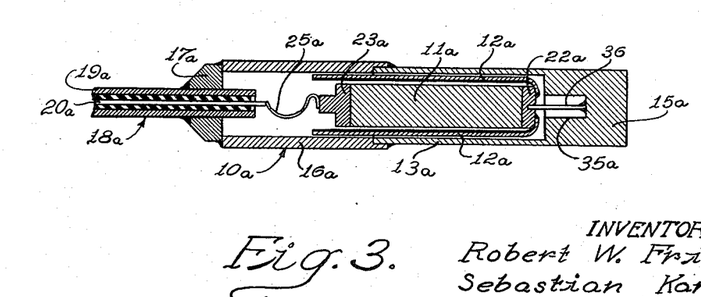
Figures 3 through 5 are fragmentary longitudinal sectional views illustrating other forms of the thermocouple and lead assemblies constructed in accordance with the teachings of the present invention parts of the leads for said assemblies being removed.

Figure 3 illustrates another form of thermoelectric generator constructed in accordance with the present invention and comprising a shock resistant mounting means for a frangible thermocouple element 11a which may be semi-metallic in character. In Figure 3 the elements indicated by reference numerals having the suffix "a" correspond to similar elements in Figure 1 indicated by the same reference numerals without a suffix. In the form of the invention shown in Figure 3, the metal band members or spring strips 12a terminate short of the adjacent end of the coaxial lead 18a, and function primarily as cushioning means for the element 11a similar to the cushioning which the strips 12 provide for the element 11 in Figure 1. The tip portion 15a of the sheath 13a is bored as at 35, and a flexible metallic connector 36 is affixed at one end to the contact electrode 22a, and the opposite end to the tip portion 15a at the base of the counterbore 35, both connections being preferably made by silver soldering or brazing with the heat therefor being supplied inductively. In Figure 3 the stainless steel sheath 13a functions as one thermocouple element, and the element 11a functions as the other thermocouple element, the sheath 13a being connected in circuit with the outer lead conductor 19a through the extension tube 16a and cap 17a as shown. The flexible nature of the connector 36 permits the latter to afford a continuous electrical connection between the contact electrode 22a and the sheath 13a without interfering with the cushioned lateral movement of the element 11a under transverse acceleration or shock.

Figure 4:
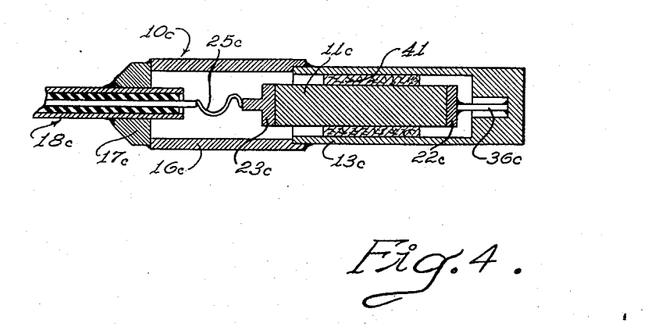

The form of the invention illustrated in Figure 4 is substantially identical with that illustrated in Figure 3 except that the metal bands 12a of Figure 3 are replaced in Figure 4 by a tubular bushing 41 of heat resistant insulating and cushioning material, for example glass fiber. A portion of the surface area of the element 11c is exposed or uncovered within the enclosure therefor comprising the sheath 13c and extension tube 16c to permit direct radiative heat transfer to and from the thermal junctions through said enclosure. In general, the optimum size of the exposed area at the ends of the element 11c is determined by the ratio of the cross-sectional area of said element to the length thereof. The tubular bushing 41 cushions the element 11c similarly to the cushioning afforded by the metal bands shown in Figures 1 to 3. Additionally, the bushing 41 serves as an insulator between the element 11c and the sheath 13c.

Figure 5:
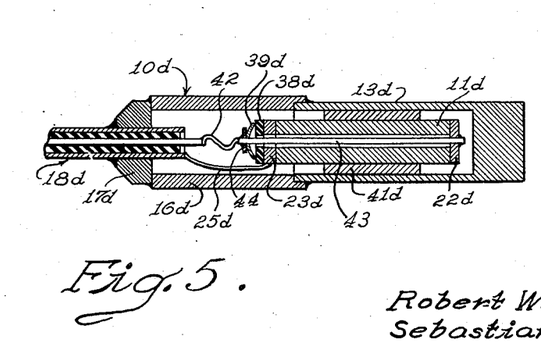

In the form of the invention illustrated in Figure 5 the element 11d is provided with a cushion support in the form of the tubular bushing 41d similar to the bushing 41 of Figure 4, and said element is additionally protected against fracture by means subjecting said element to compressive stresses. In Figure 5 the element 11d and its contact electrodes 22d and 23d are centrally bored as shown, and a metallic rod 43 comprising the second thermocouple element extends coaxially within said bore in spaced relation with respect to the element 11d and its contact electrode 23d. The element 43 is physically and electrically affixed to the contact electrode 22, as by silver soldering or brazing. Fixed on the end of the rod 43 and spaced from the contact electrode 23d as shown is a shoulder member 44 which may take the form of a washer. Surrounding the rod 43 and interposed between the shoulder member 44 and the contact electrode 23d are an insulating washer 38d, in engagement with said contact electrode, and a compression spring 39d which may take the form of a centrally apertured concavo-convex spring washer. The spring 39d places the metal rod 43 under tensile stress, and simultaneously places the element 11d under compressive stress. A flexible conductor member 25d connects the contact electrode 23d with the outer tubular conductor of the lead 18d, and a flexible conductor 42 connects the rod 43 in circuit with the inner conductor of the lead 18d. As aforementioned, the bushing 41d provides a cushion affording a free floating support for the sub-assembly comprising the elements 11d and 43, and the structure further provides a neutral axis for the compressive and tensile stresses within the tubular element 11d arising from bending or shearing forces which may occur during transverse acceleration or shock. The compression of element 11d afforded by the spring 39d reduces the net tensile stresses to which said element is subjected and thereby affords the latter substantial shock resistance in addition to that afforded by the cushioning effect of the bushing 41d. The compressive stresses exertable on the element 11d by the spring 39d are maintained within the compressive strength of said element at all times.

While the electrically conductive elements of frangible material for which improved shock resistant mounting means is provided may take the form of semi-metallic thermocouple elements, it is to be understood that the specific illustrations given are for the purpose of disclosure only and are not intended to impose unnecessary

What is claimed as the invention is:

1. A thermoelectric device comprising a metallic tubular enclosure, an elongated thermoelectric element disposed in radially spaced relation within said enclosure and with which said metallic enclosure is coextensive, means in circuit with said metallic enclosure forming a thermoelectric junction with one end of said thermoelectric element, and mounting means for said thermoelectric element permitting movement of all portions of said element in any radial direction within said enclosure, comprising resilient cushioning means extending longitudinally within the radial space between said thermoelectric element and said enclosure in surrounding relation with respect to said thermoelectric element and engaging side wall portions of said element and of said enclosure to cushion the radial movement of said element caused by radial shocks imparted to said enclosure.

2. A thermoelectric device comprising a metallic tubular enclosure, an elongated thermoelectric element disposed in radially spaced relation within said enclosure and with which said metallic enclosure is coextensive, means in circuit with said metallic enclosure forming a thermoelectric junction with one end of said thermoelectric element, and mounting means for said thermoelectric element permitting movement of all portions of said element in any radial direction within said enclosure, comprising resilient metallic cushioning means extending longitudinally within the radial space between said thermoelectric element and said enclosure in surrounding relation with respect to said thermoelectric element and engaging side wall portions of said element and of said enclosure to cushion the radial movement of said element caused by radial shocks imparted to said enclosure, said metallic cushioning means being connected in the circuit between said thermoelectric junction forming means and said metallic enclosure and forming at least one second thermoelectric element.

3. A thermoelectric device comprising a metallic tubular enclosure, an elongated thermoelectric element disposed in radially spaced relation within said enclosure and with which said metallic enclosure is coextensive, means in circuit with said metallic enclosure forming a thermoelectric junction with one end of said thermoelectric element, and mounting means for said thermoelectric element permitting movement of all portions of said element in any radial direction within said enclosure, comprising means affording endwise compression of said thermoelectric element, and resilient cushioning means extending longitudinally within the radial space between said thermoelectric element and said enclosure in surrounding relation with respect to said thermoelectric element and engaging side wall portions of said element and of said enclosure to cushion the radial movement of said element caused by radial shocks imparted to said enclosure.

4. A thermoelectric device comprising a metallic tubular enclosure, an elongated thermoelectric element disposed in radially spaced relation within said enclosure and with which said metallic enclosure is coextensive, means in circuit with said metallic enclosure forming a thermoelectric junction with one end of said thermoelectric element, and mounting means for said thermoelectric element permitting movement of all portions of said element in any radial direction within said enclosure, comprising resilient cushioning means extending longitudinally within the radial space between said thermoelectric element and said enclosure in surrounding relation with respect to said thermoelectric element and engaging side wall portions of said element and of said enclosure to cushion the radial movement of said element caused by radial shocks imparted to said enclosure, said resilient means being shaped to expose the end portions of said thermoelectric element to the enclosure for radiative heat transfer to and from said end portions through said enclosure.

5. A thermoelectric device comprising a metallic tubular enclosure comprising a first thermoelectric element, an elongated second thermoelectric element disposed in radially spaced relation within said enclosure and with which said metallic enclosure is coextensive, means including a flexible electrical conductor forming a thermoelectric junction between one end of said first thermoelectric element and the adjacent end of said second thermoelectric element, and mounting means for said second thermoelectric element permitting movement of all portions of said element in any radial direction within said enclosure, comprising resilient cushioning means extending longitudinally within the radial space between said thermoelectric element and said enclosure in surrounding relation with respect to said second thermoelectric element and engaging side wall portions of said second element and of said enclosure to cushion the radial movement of said second element caused by radial shocks imparted to said enclosure.

6. A thermoelectric device comprising a metallic tubular enclosure, an elongated thermoelectric element disposed in radially spaced relation within said enclosure and with which said metallic enclosure is coextensive, means in circuit with said metallic enclosure forming a thermoelectric junction with one end of said thermoelectric element, and mounting means for said thermoelectric element permittting movement of all portions of said element in any radial direction within said enclosure, comprising a plurality of elongated resilient spacer members extending longitudinally within the radial space between said thermoelectric element and said enclosure in surrounding relation with respect to said thermoelectric element and engaging side wall portions of said element and of said enclosure to cushion the radial movement of said element caused by radial shocks imparted to said enclosure.

7. A thermoelectric device comprising a metallic tubular enclosure, an elongated thermoelectric element disposed in radially spaced relation within said enclosure and with which said metallic enclosure is coextensive, means in circuit with said metallic enclosure forming a thermoelectric junction with one end of said thermoelectric element, and mounting means for said thermoelectric element permitting movement of all portions of said element in any radial direction within said enclosure, comprising a sleeve of heat resistant resilient material extending longitudinally within the radial space between said thermoelectric element and said enclosure in surrounding relation with respect to said thermoelectric element and engaging side wall portions of said element and of said enclosure to cushion the radial movement of said element caused by radial shocks imparted to said enclosure.

8. A thermoelectric device comprising a metallic tubular enclosure, an elongated thermoelectric element disdlsposed in radially spaced relation within said enclosure and with which said metallic enclosure is coextensive, means in circuit with said metallic enclosure forming a thermoelectric junction with one end of said thermoelectric element, and mounting means for said thermoelectric element permitting movement of all portions of said element in any radial direction within said enclosure, comprising a sleeve of heat resistant resilient material extending longitudinally within the radial space between said thermoelectric element and said enclosure in surrounding relation with respect to said thermoelectric element and engaging side wall portions of said element and of said enclosure to cushion the radial movement of said element caused by radial shocks imparted to said enclosure, said sleeve terminating short of the ends of said thermoelectric element to expose said ends within said enclosure and permit radiative heat transfer to and from said ends through said enclosure.

9. A thermoelectric device comprising a metallic tubular enclosure, an elongated thermoelectric element disposed in radially spaced relation within said enclosure and with which said metallic enclosure is coextensive, means in circuit with said metallic enclosure forming a thermoelectric junction with one end of said thermoelectric element, and mounting means for said thermoelectric element permitting movement of all portions of said element in any radial direction within said enclosure, comprising spring means affording endwise compression of said thermoelectric element, and a sleeve of heat resistant resilient material extending longitudinally within the radial space between said thermoelectric element and said enclosure in surrounding relation with respect to said thermoelectric element and engaging side wall portions of said element and of said enclosure to cushion the radial movement of said element caused by radial shocks imparted to said enclosure.

References Cited in the file of this patent

UNITED STATES PATENTS

| | | |
|---|---|---|
| 2,152,153 | Ridgway | Mar. 28, 1939 |
| 2,232,961 | Milnes | Feb. 25, 1941 |
| 2,271,975 | Hall | Feb. 3, 1942 |
| 2,384,756 | Kuenstler | Sept. 11, 1945 |
| 2,440,709 | Young | May 4, 1948 |
| 2,480,557 | Cummins | Aug. 30, 1949 |
| 2,698,352 | Fagg et al. | Dec. 28, 1954 |